No. 789,553. PATENTED MAY 9, 1905.
G. R. LANG.
T-BOLT.
APPLICATION FILED OCT. 28, 1904.

WITNESSES:
C. Munker
A. E. Fay.

INVENTOR
George R. Lang
BY
ATTORNEYS

No. 789,553.  
Patented May 9, 1905.

UNITED STATES PATENT OFFICE.

GEORGE ROSS LANG, OF CINCINNATI, OHIO.

T-BOLT.

SPECIFICATION forming part of Letters Patent No. 789,553, dated May 9, 1905.

Application filed October 28, 1904. Serial No. 230,310.

*To all whom it may concern:*

Be it known that I, GEORGE ROSS LANG, a citizen of the United States, and a resident of Cincinnati, in the county of Hamilton and State of Ohio, have invented a new and Improved T-Bolt, of which the following is a full, clear, and exact description.

My invention relates to a T-bolt for use on planers, boring-mills, and other machine-tools to fasten the work upon the bed of the machine. It is customary at the present time to clamp the work upon machines of this character by means of bolts having heads passing into T-slots in the surface of the bed. When a different size or class of work is substituted for the one previously used, these bolts have to be changed, and hunting for new bolts of the proper length consumes much time and is a great waste. Also when bolts of the proper length are not on hand new ones have to be forged in a blacksmith's shop and threads turned upon them to receive the nut which has to be used.

It is the object of my invention to do away with these expensive delays and with the necessity for forging the bolts at frequent intervals. This I accomplish by means of a removable head for the bolt, which can be used with any length of bolt and does not have to be renewed.

Reference is to be had to the accompanying drawings, forming a part of this specification, in which similar characters of reference indicate corresponding parts in all the figures.

Figure 1:
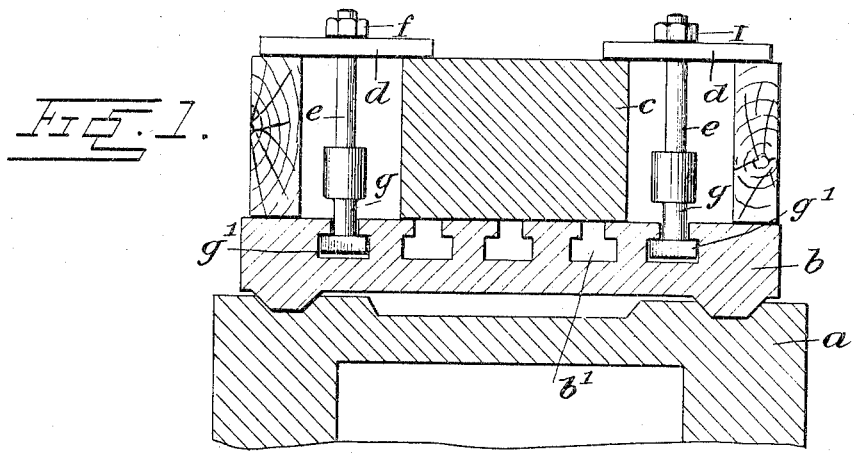
Figure 2:
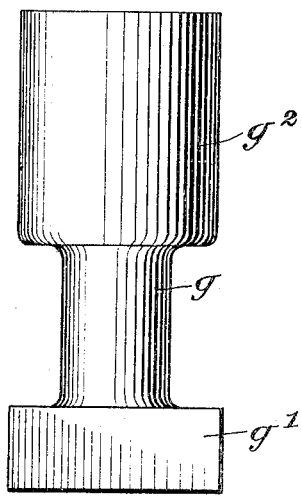
Figure 3:
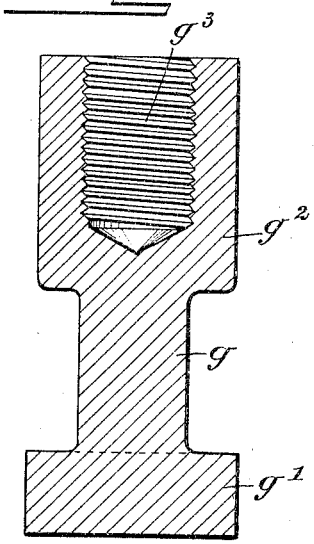
Figure 4:
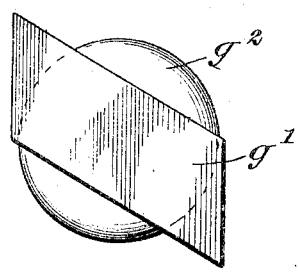

Figure 1 represents a transverse sectional view of a planer-bed provided with a preferred form of my invention. Fig. 2 is a side elevation of one of the removable heads. Fig. 3 is a longitudinal central section of the same, and Fig. 4 is a bottom view of the same.

In the drawings, $a$ represents the frame of the planer; $b$, the bed; $b'$, the T-slots in the bed; $c$, the work upon the bed, and $d$ clamps which are secured in position by means of bolts $e$, nuts $f$, and T-heads $g$, which constitute the main part of my invention.

The particular form illustrated in the drawings represents the invention; but it is not to be taken as being the only form in which said invention is capable of embodiment. The bolt $e$ is of very simple construction, with a thread on each end. The T-head $g$ is preferably provided with an angular T-shaped projection $g'$, which is intended to pass into the slots $b'$ in the bed from the top and lock itself with a half-turn. It is also provided with a projection $g^2$ at the other end thereof, having a cavity provided with an internal screw-thread $g^3$ for receiving the lower end of the bolt $e$. By forming the T-head in the manner shown in Fig. 4 it can be inserted in one of the slots $b'$ without removing chips from the entire slot. When the work is changed and a bolt of different length is required, it will not necessitate the use of other T-heads, but merely the removal of the bolts therefrom, which can be replaced by other bolts of different lengths. In case bolts of the proper length cannot be found it is a simple matter to take an ordinary piece of round bar-iron or the like and turn the threads on it, so that it will answer the purpose. The T-heads are preferably made of steel, so that they will stand a great deal of strain and will consequently be of very long life. It will thus be seen that a most convenient and useful device is obtained, that it is exceedingly easy to make bolts of any length desired, that there is no trouble about slipping the heads into the T-slots, that the work can be clamped through cored holes through which it would be an impossibility to get an ordinary bolt-head, that it takes up very little space, and that it has all the advantages of the ordinary T-head bolt heretofore used for this purpose.

Having thus described my invention, I claim as new and desire to secure by Letters Patent—

1. A clamping device, comprising a bolt, a nut therefor, and a separable head adjustably mounted upon the bolt, said head being provided with a contracted neck and a projection extending at right angles to the head from the end of the neck, said projection being in the form of a parallelogram having acute and obtuse angles, whereby the head is adapted to be moved into T-slots and is prevented from turning therein.

2. A clamping device comprising a bolt, a nut therefor and a separable T-bolt head having a neck, an extension thereon projecting outwardly therefrom and adapted to enter T-slots in a machine-tool bed, and means for securing said head to a bolt.

3. A clamping device comprising a bolt, a nut therefor and a separable T-bolt head having an angular extension projecting outwardly therefrom at the lower end thereof, and a tubular projection upon the upper end thereof having a screw-threaded cavity therein.

In testimony whereof I have signed my name to this specification in the presence of two subscribing witnesses.

GEORGE ROSS LANG.

Witnesses:
  S. E. SIMPSON,
  E. A. CADEN.